(12) United States Patent
Kim et al.

(10) Patent No.: US 10,848,752 B2
(45) Date of Patent: Nov. 24, 2020

(54) METHOD OF OPERATING A LIGHT FIELD 3D DISPLAY DEVICE HAVING AN RGBG PIXEL STRUCTURE, AND LIGHT FIELD 3D DISPLAY DEVICE

(71) Applicant: SAMSUNG DISPLAY CO, LTD., Yongin-si (KR)

(72) Inventors: Beomshik Kim, Yongin-si (KR); Yi Joon Ahn, Seoul (KR); Jaejoong Kwon, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 8 days.

(21) Appl. No.: 16/260,697

(22) Filed: Jan. 29, 2019

(65) Prior Publication Data
US 2019/0253697 A1    Aug. 15, 2019

(30) Foreign Application Priority Data
Feb. 14, 2018    (KR) .......................... 10-2018-0018350

(51) Int. Cl.
*H04N 13/351*    (2018.01)
*G09G 3/20*    (2006.01)
*G09G 3/00*    (2006.01)
*H04N 13/305*    (2018.01)
*H04N 13/324*    (2018.01)
(Continued)

(52) U.S. Cl.
CPC ........... *H04N 13/351* (2018.05); *G09G 3/003* (2013.01); *G09G 3/2003* (2013.01); *H04N 13/305* (2018.05); *H04N 13/317* (2018.05); *H04N 13/324* (2018.05); *G09G 5/14* (2013.01); *G09G 2300/0452* (2013.01); *G09G 2320/028* (2013.01)

(58) Field of Classification Search
CPC .. H04N 13/351; H04N 13/305; H04N 13/324; H04N 13/317; G09G 3/2003; G09G 3/003; G09G 2320/028; G09G 5/14; G09G 2300/0452
See application file for complete search history.

(56) References Cited

U.S. PATENT DOCUMENTS

| | | | |
|---|---|---|---|
| 6,064,424 A | 5/2000 | Van Berkel et al. | |
| 2009/0021534 A1* | 1/2009 | Tomizawa | G09G 3/2003 345/690 |

(Continued)

FOREIGN PATENT DOCUMENTS

KR    1020160051154    5/2016

*Primary Examiner* — Jonathan A Boyd
(74) *Attorney, Agent, or Firm* — F. Chau & Associates, LLC

(57) ABSTRACT

In a method of operating a light field three-dimensional (3D) display device having an RGBG pixel structure, multi-view image data including RGB data at multiple points of view are received, RGB rearrangement data including R sub-pixel data, G sub-pixel data, and B sub-pixel data are generated from the multi-view image data by extracting two adjacent ones of the R sub-pixel data at a same pixel row at a same point of view, by extracting two adjacent ones of the G sub-pixel data at a same pixel row at different points of view, and by extracting two adjacent ones of the B sub-pixel data at a same pixel row at a same point of view, RGBG data are generated by performing RGB-to-RGBG data conversion on the RGB rearrangement data, and a 3D image is displayed using the RGBG data.

20 Claims, 14 Drawing Sheets

(51) Int. Cl.
*H04N 13/317* (2018.01)
*G09G 5/14* (2006.01)

(56) References Cited

U.S. PATENT DOCUMENTS

| | | | |
|---|---|---|---|
| 2014/0092223 A1* | 4/2014 | Lin | G02B 30/27 |
| | | | 348/54 |
| 2015/0117774 A1* | 4/2015 | Yang | G06T 9/00 |
| | | | 382/166 |
| 2017/0085865 A1* | 3/2017 | Sumi | H04N 13/324 |

* cited by examiner

| RGB REARRANGEMENT DATA | | | | | | | | | | | | |
|---|---|---|---|---|---|---|---|---|---|---|---|---|
| V1_R(1,1) | V2_G(1,1) | V3_B(1,1) | V1_R(1,2) | V4_G(1,2) | V3_B(1,2) | V5_R(1,3) | V1_G(1,3) | V2_B(1,3) | V5_R(1,4) | V3_G(1,4) | V2_B(1,4) |
| V3_R(2,1) | V2_G(2,1) | V1_B(2,1) | V3_R(2,2) | V4_G(2,2) | V1_B(2,2) | V2_R(2,3) | V1_G(2,3) | V5_B(2,3) | V2_R(2,4) | V3_G(2,4) | V5_B(2,4) |
| V1_R(3,1) | V2_G(3,1) | V3_B(3,1) | V1_R(3,2) | V4_G(3,2) | V3_B(3,2) | V5_R(3,3) | V1_G(3,3) | V2_B(3,3) | V5_R(3,4) | V3_G(3,4) | V2_B(3,4) |
| V3_R(4,1) | V2_G(4,1) | V1_B(4,1) | V3_R(4,2) | V4_G(4,2) | V1_B(4,2) | V2_R(4,3) | V1_G(4,3) | V5_B(4,3) | V2_R(4,4) | V3_G(4,4) | V5_B(4,4) |

RGBG DATA

| (V1_R(1,1)+V1_R(1,2))/2 | V2_G(1,1) | (V3_B(1,1)+V3_B(1,2))/2 | V4_G(1,2) | (V5_B(1,3)+V5_B(1,4))/2 | V1_G(1,3) | (V2_R(1,3)+V2_R(1,4))/2 | V3_G(1,4) |
| (V1_R(2,1)+V1_R(2,2))/2 | V2_G(2,1) | (V3_B(2,1)+V3_B(2,2))/2 | V4_G(2,2) | (V5_B(2,3)+V5_B(2,4))/2 | V1_G(2,3) | (V2_R(2,3)+V2_R(2,4))/2 | V3_G(2,4) |
| (V1_R(3,1)+V1_R(3,2))/2 | V2_G(3,1) | (V3_B(3,1)+V3_B(3,2))/2 | V4_G(3,2) | (V5_B(3,3)+V5_B(3,4))/2 | V1_G(3,3) | (V2_R(3,3)+V2_R(3,4))/2 | V3_G(3,4) |
| (V1_R(4,1)+V1_R(4,2))/2 | V2_G(4,1) | (V3_B(4,1)+V3_B(4,2))/2 | V4_G(4,2) | (V5_B(4,3)+V5_B(4,4))/2 | V1_G(4,3) | (V2_R(4,3)+V2_R(4,4))/2 | V3_G(4,4) |

RGB REARRANGEMENT DATA

| V1_R(1,1) | V2_G(1,1) | V3_B(1,2) | V4_G(1,2) | V1_R(1,1) | V3_B(1,2) | V1_G(1,3) | V2_B(1,2) | V5_R(1,3) | V2_B(1,3) | V1_G(1,4) | V2_B(1,3) | V5_R(1,4) | V2_B(1,4) |
| V3_R(2,2) | V2_G(2,2) | V1_B(2,1) | V4_G(2,2) | V3_R(2,1) | V1_B(2,2) | V1_G(2,3) | V5_B(2,3) | V2_R(2,4) | V2_B(2,3) | V3_G(2,4) | V2_B(2,4) | V5_R(2,4) | V5_B(2,3) |
| V1_R(3,1) | V2_G(3,1) | V3_B(3,2) | V4_G(3,2) | V1_R(3,1) | V3_B(3,2) | V1_G(3,3) | V2_B(3,4) | V5_R(3,3) | V2_B(3,4) | V1_G(3,4) | V2_B(3,4) | V5_R(3,4) | V2_B(3,3) |
| V3_R(4,2) | V2_G(4,1) | V1_B(4,1) | V4_G(4,2) | V3_R(4,1) | V1_B(4,2) | V1_G(4,3) | V5_B(4,3) | V2_R(4,4) | V2_B(4,3) | V3_G(4,4) | V2_B(4,4) | V5_R(4,4) | V5_B(4,3) |

METHOD OF OPERATING A LIGHT FIELD 3D DISPLAY DEVICE HAVING AN RGBG PIXEL STRUCTURE, AND LIGHT FIELD 3D DISPLAY DEVICE

CROSS-REFERENCE TO RELATED APPLICATION

This application claims priority under 35 U.S.C. § 119 to Korean Patent Application No. 10-2018-0018350, filed on Feb. 14, 2018 in the Korean Intellectual Property Office (KIPO), the disclosure of which is incorporated by reference herein in its entirety.

TECHNICAL FIELD

Exemplary embodiments of the inventive concept relate generally to display devices, and more particularly, to light field three-dimensional (3D) display devices having an RGBG pixel structure, and methods of operating the light field 3D display devices.

DISCUSSION OF RELATED ART

Most of currently commercialized 3D display devices employ a principle in which a depth effect is provided by displaying different images to each eye of a user. However, in such a display device, only binocular disparity information may be provided to the user, and monocular depth perception factors, for example, focus adjustment and motion parallax, may not be transmitted. Thus, a 3D image may not be natural and may cause eye fatigue.

To display a natural 3D image without causing fatigue, 3D display technologies that display a spatio-angular distribution of rays, for example, a light field, have been developed. Here, the light field may refer to a distribution of rays from an object with respect to positions or directions. When such a light field is optically displayed on a plane, a user positioned behind the plane may experience a ray distribution similar to a case in which an actual object is provided and thus, may view a natural 3D image of the object.

In this 3D display technology providing the light field, RGB image data suitable for an RGB stripe structure may be used, where respective sub-pixel columns have different points of view. However, in a case where a 3D display device having an RGBG pentile pixel structure displays a 3D image based on the RGB image data having the RGB stripe structure, images of two different points of view may be displayed at one sub-pixel column.

SUMMARY

According to an exemplary embodiment of the inventive concept, in a method of operating a light field 3D display device having an RGBG pixel structure, multi-view image data including RGB data at multiple points of view are received, RGB rearrangement data including R sub-pixel data, G sub-pixel data, and B sub-pixel data are generated from the multi-view image data by extracting two adjacent ones of the R sub-pixel data at a same pixel row from the RGB data at a same point of view among the multi-view image data, by extracting two adjacent ones of the G sub-pixel data at a same pixel row from the RGB data at different points of view among the multi-view image data, and by extracting two adjacent ones of the B sub-pixel data at a same pixel row from the RGB data at a same point of view among the multi-view image data, RGBG data are generated by performing RGB-to-RGBG data conversion on the RGB rearrangement data, and a 3D image is displayed using the RGBG data.

In an exemplary embodiment of the inventive concept, among the RGB rearrangement data, the two adjacent ones of the R sub-pixel data at an odd-numbered pixel row and adjacent first and second pixel columns, and the two adjacent ones of the B sub-pixel data at an even-numbered pixel row adjacent to the odd-numbered pixel row and the first and second pixel columns may be extracted from the RGB data at a same point of view among the multi-view image data.

In an exemplary embodiment of the inventive concept, among the RGB rearrangement data, the two adjacent ones of the B sub-pixel data at an odd-numbered pixel row and adjacent first and second pixel columns, and the two adjacent ones of the R sub-pixel data at an even-numbered pixel row adjacent to the odd-numbered pixel row and the first and second pixel columns may be extracted from the RGB data at a same point of view among the multi-view image data.

In an exemplary embodiment of the inventive concept, the multi-view image data may include first view point RGB data, second view point RGB data, third view point RGB data, and fourth view point RGB data. First and second R sub-pixel data at a first pixel row and adjacent first and second pixel columns among the RGB rearrangement data may be extracted from the first view point RGB data, first G sub-pixel data at the first pixel row and the first pixel column among the RGB rearrangement data may be extracted from the second view point RGB data, first and second B sub-pixel data at the first pixel row and the first and second pixel columns among the RGB rearrangement data may be extracted from the third view point RGB data, and second G sub-pixel data at the first pixel row and the second pixel column among the RGB rearrangement data may be extracted from the fourth view point RGB data.

In an exemplary embodiment of the inventive concept, the first R sub-pixel data of the RGB rearrangement data may be extracted from R sub-pixel data at the first pixel row and the first pixel column among the first view point RGB data, the second R sub-pixel data of the RGB rearrangement data may be extracted from R sub-pixel data at the first pixel row and the second pixel column among the first view point RGB data, the first G sub-pixel data of the RGB rearrangement data may be extracted from G sub-pixel data at the first pixel row and the first pixel column among the second view point RGB data, the first B sub-pixel data of the RGB rearrangement data may be extracted from B sub-pixel data at the first pixel row and the first pixel column among the third view point RGB data, the second B sub-pixel data of the RGB rearrangement data may be extracted from B sub-pixel data at the first pixel row and the second pixel column among the third view point RGB data, and the second G sub-pixel data of the RGB rearrangement data may be extracted from G sub-pixel data at the first pixel row and the second pixel column among the fourth view point RGB data.

In an exemplary embodiment of the inventive concept, the first R sub-pixel data of the RGB rearrangement data may be extracted from R sub-pixel data at the first pixel row and the first pixel column among the first view point RGB data, the second R sub-pixel data of the RGB rearrangement data may be obtained by duplicating the first R sub-pixel data, the first G sub-pixel data of the RGB rearrangement data may be extracted from G sub-pixel data at the first pixel row and the first pixel column among the second view point RGB data, the second B sub-pixel data of the RGB rearrangement data may be extracted from B sub-pixel data at the first pixel row and the second pixel column among the third view point RGB data, the first B sub-pixel data of the RGB rearrangement data may be obtained by duplicating the second B sub-pixel data, and the second G sub-pixel data of the RGB rearrangement data may be extracted from G sub-pixel data at the first pixel row and the second pixel column among the fourth view point RGB data.

In an exemplary embodiment of the inventive concept, third and fourth R sub-pixel data at a second pixel row adjacent to the first pixel row and the first and second pixel columns among the RGB rearrangement data may be extracted from the third view point RGB data, third G sub-pixel data at the second pixel row and the first pixel column among the RGB rearrangement data may be extracted from the second view point RGB data, third and fourth B sub-pixel data at the second pixel row and the first and second pixel columns among the RGB rearrangement data may be extracted from the first view point RGB data, and fourth G sub-pixel data at the second pixel row and the second pixel column among the RGB rearrangement data may be extracted from the fourth view point RGB data.

In an exemplary embodiment of the inventive concept, the third R sub-pixel data of the RGB rearrangement data may be extracted from R sub-pixel data at the second pixel row and the first pixel column among the third view point RGB data, the fourth R sub-pixel data of the RGB rearrangement data may be extracted from R sub-pixel data at the second pixel row and the second pixel column among the third view point RGB data, the third G sub-pixel data of the RGB rearrangement data may be extracted from G sub-pixel data at the second pixel row and the first pixel column among the second view point RGB data, the third B sub-pixel data of the RGB rearrangement data may be extracted from B sub-pixel data at the second pixel row and the first pixel column among the first view point RGB data, the fourth B sub-pixel data of the RGB rearrangement data may be extracted from B sub-pixel data at the second pixel row and the second pixel column among the first view point RGB data, and the fourth G sub-pixel data of the RGB rearrangement data may be extracted from G sub-pixel data at the second pixel row and the second pixel column among the fourth view point RGB data.

In an exemplary embodiment of the inventive concept, the fourth R sub-pixel data of the RGB rearrangement data may be extracted from R sub-pixel data at the second pixel row and the second pixel column among the third view point RGB data, the third R sub-pixel data of the RGB rearrangement data may be obtained by duplicating the fourth R sub-pixel data, the third G sub-pixel data of the RGB rearrangement data may be extracted from G sub-pixel data at the second pixel row and the first pixel column among the second view point RGB data, the third B sub-pixel data of the RGB rearrangement data may be extracted from B sub-pixel data at the second pixel row and the first pixel column among the first view point RGB data, the fourth B sub-pixel data of the RGB rearrangement data may be obtained by duplicating the third B sub-pixel data, and the fourth G sub-pixel data of the RGB rearrangement data may be extracted from G sub-pixel data at the second pixel row and the second pixel column among the fourth view point RGB data.

In an exemplary embodiment of the inventive concept, to generate the RGBG data by performing the RGB-to-RGBG data conversion on the RGB rearrangement data, the two adjacent ones of the R sub-pixel data at a first pixel row and adjacent first and second pixel columns among the RGB rearrangement data may be averaged to generate first R sub-pixel data at the first pixel row and the first pixel column among the RGBG data, first G sub-pixel data at the first pixel row and the first pixel column among the RGBG data that is substantially the same as the G sub-pixel data at the first pixel row and the first pixel column among the RGB rearrangement data may be generated, the two adjacent ones of the B sub-pixel data at the first pixel row and the first and second pixel columns among the RGB rearrangement data may be averaged to generate first B sub-pixel data at the first pixel row and the second pixel column among the RGBG data, and second G sub-pixel data at the first pixel row and the second pixel column among the RGBG data that is substantially the same as the G sub-pixel data at the first pixel row and the second pixel column among the RGB rearrangement data may be generated.

In an exemplary embodiment of the inventive concept, to generate the RGBG data by performing the RGB-to-RGBG data conversion on the RGB rearrangement data, the two adjacent ones of the B sub-pixel data at a second pixel row adjacent to the first pixel row and the first and second pixel columns among the RGB rearrangement data may be averaged to generate second B sub-pixel data at the second pixel row and the first pixel column among the RGBG data, third G sub-pixel data at the second pixel row and the first pixel column among the RGBG data that is substantially the same as the G sub-pixel data at the second pixel row and the first pixel column among the RGB rearrangement data may be generated, the two adjacent ones of the R sub-pixel data at the second pixel row and the first and second pixel columns among the RGB rearrangement data may be averaged to generate second R sub-pixel data at the second pixel row and the second pixel column among the RGBG data, and fourth G sub-pixel data at the second pixel row and the second pixel column among the RGBG data that is substantially the same as the G sub-pixel data at the second pixel row and the second pixel column among the RGB rearrangement data may be generated.

In an exemplary embodiment of the inventive concept, generating the RGB rearrangement data and the RGB-to-RGBG data conversion may be performed by a display driver included in the light field 3D display device.

In an exemplary embodiment of the inventive concept, generating the RGB rearrangement data may be performed by a host processor that controls the light field 3D display device, and the RGB-to-RGBG data conversion may be performed by a display driver included in the light field 3D display device.

According to an exemplary embodiment of the inventive concept, in a method of operating a light field 3D display device having an RGBG pixel structure, multi-view image data including first through fourth view point RGB data are received, RGB rearrangement data including first and second R sub-pixel data, first and second G sub-pixel data, and first and second B sub-pixel data are generated from the multi-view image data by extracting the first and second R sub-pixel data at a first pixel row and adjacent first and second pixel columns from the first view point RGB data, by extracting the first G sub-pixel data at the first pixel row and the first pixel column from the second view point RGB data, by extracting the first and second B sub-pixel data at the first pixel row and the first and second pixel columns from the third view point RGB data, and by extracting the second G sub-pixel data at the first pixel row and the second pixel column from the fourth view point RGB data, RGBG data are generated by performing RGB-to-RGBG data conversion on the RGB rearrangement data, and a 3D image is displayed using the RGBG data.

In an exemplary embodiment of the inventive concept, the first R sub-pixel data of the RGB rearrangement data may be extracted from R sub-pixel data at the first pixel row and the first pixel column among the first view point RGB data, the second R sub-pixel data of the RGB rearrangement data may be extracted from R sub-pixel data at the first pixel row and the second pixel column among the first view point RGB data, the first G sub-pixel data of the RGB rearrangement data may be extracted from G sub-pixel data at the first pixel row and the first pixel column among the second view point RGB data, the first B sub-pixel data of the RGB rearrangement data may be extracted from B sub-pixel data at the first pixel row and the first pixel column among the third view point RGB data, the second B sub-pixel data of the RGB rearrangement data may be extracted from B sub-pixel data at the first pixel row and the second pixel column among the third view point RGB data, and the second G sub-pixel data of the RGB rearrangement data may be extracted from G sub-pixel data at the first pixel row and the second pixel column among the fourth view point RGB data.

In an exemplary embodiment of the inventive concept, the first R sub-pixel data of the RGB rearrangement data may be extracted from R sub-pixel data at the first pixel row and the first pixel column among the first view point RGB data, the second R sub-pixel data of the RGB rearrangement data may be obtained by duplicating the first R sub-pixel data, the first G sub-pixel data of the RGB rearrangement data may be extracted from G sub-pixel data at the first pixel row and the first pixel column among the second view point RGB data, the second B sub-pixel data of the RGB rearrangement data may be extracted from B sub-pixel data at the first pixel row and the second pixel column among the third view point RGB data, the first B sub-pixel data of the RGB rearrangement data may be obtained by duplicating the second B sub-pixel data, and the second G sub-pixel data of the RGB rearrangement data may be extracted from G sub-pixel data at the first pixel row and the second pixel column among the fourth view point RGB data.

In an exemplary embodiment of the inventive concept, third and fourth R sub-pixel data at a second pixel row adjacent to the first pixel row and the first and second pixel columns among the RGB rearrangement data may be extracted from the third view point RGB data, third G sub-pixel data at the second pixel row and the first pixel column among the RGB rearrangement data may be extracted from the second view point RGB data, third and fourth B sub-pixel data at the second pixel row and the first and second pixel columns among the RGB rearrangement data may be extracted from the first view point RGB data, and fourth G sub-pixel data at the second pixel row and the second pixel column among the RGB rearrangement data may be extracted from the fourth view point RGB data.

In an exemplary embodiment of the inventive concept, the third R sub-pixel data of the RGB rearrangement data may be extracted from R sub-pixel data at the second pixel row and the first pixel column among the third view point RGB data, the fourth R sub-pixel data of the RGB rearrangement data may be extracted from R sub-pixel data at the second pixel row and the second pixel column among the third view point RGB data, the third G sub-pixel data of the RGB rearrangement data may be extracted from G sub-pixel data at the second pixel row and the first pixel column among the second view point RGB data, the third B sub-pixel data of the RGB rearrangement data may be extracted from B sub-pixel data at the second pixel row and the first pixel column among the first view point RGB data, the fourth B sub-pixel data of the RGB rearrangement data may be extracted from B sub-pixel data at the second pixel row and the second pixel column among the first view point RGB data, and the fourth G sub-pixel data of the RGB rearrangement data may be extracted from G sub-pixel data at the second pixel row and the second pixel column among the fourth view point RGB data.

In an exemplary embodiment of the inventive concept, the fourth R sub-pixel data of the RGB rearrangement data may be extracted from R sub-pixel data at the second pixel row and the second pixel column among the third view point RGB data, the third R sub-pixel data of the RGB rearrangement data may be obtained by duplicating the fourth R sub-pixel data, the third G sub-pixel data of the RGB rearrangement data may be extracted from G sub-pixel data at the second pixel row and the first pixel column among the second view point RGB data, the third B sub-pixel data of the RGB rearrangement data may be extracted from B sub-pixel data at the second pixel row and the first pixel column among the first view point RGB data, the fourth B sub-pixel data of the RGB rearrangement data may be obtained by duplicating the third B sub-pixel data, and the fourth G sub-pixel data of the RGB rearrangement data may be extracted from G sub-pixel data at the second pixel row and the second pixel column among the fourth view point RGB data.

According to an exemplary embodiment of the inventive concept, a light field 3D display device includes a display panel having an RGBG pixel structure, an optical device configured to control directions of light rays generated by the display panel, and a display driver configured to receive multi-view image data including RGB data at multiple points of view, and to drive the display panel to display a 3D image using RGBG data. The display driver includes an RGB data rearranging block configured to generate RGB rearrangement data including R sub-pixel data, G sub-pixel data, and B sub-pixel data from the multi-view image data by extracting two adjacent ones of the R sub-pixel data at a same pixel row from the RGB data at a same point of view among the multi-view image data, by extracting two adjacent ones of the G sub-pixel data at a same pixel row from the RGB data at different points of view among the multi-view image data, and by extracting two adjacent ones of the B sub-pixel data at a same pixel row from the RGB data at a same point of view among the multi-view image data, and an RGB-to-RGBG converter configured to generate the RGBG data by performing RGB-to-RGBG data conversion on the RGB rearrangement data.

BRIEF DESCRIPTION OF THE DRAWINGS

The above and other features of the inventive concept will be more clearly understood by describing in detail exemplary embodiments thereof with reference to the accompanying drawings.

FIG. 9 is a diagram illustrating an example of multi-view image data including RGB data at multiple points of view according to an exemplary embodiment of the inventive concept.

FIG. 10 is a diagram illustrating an example of RGB rearrangement data generated from the multi-view image data of FIG. 9 using the method of FIG. 8 according to an exemplary embodiment of the inventive concept.

FIG. 11 is a diagram illustrating an example of RGBG data converted from the RGB rearrangement data of FIG. 10 using the method of FIG. 8 according to an exemplary embodiment of the inventive concept.

FIG. 14 is a diagram illustrating an example of RGB rearrangement data generated from the multi-view image data of FIG. 9 using the method of FIG. 13 according to an exemplary embodiment of the inventive concept.

FIG. 15 is a diagram illustrating an example of RGBG data converted from the RGB rearrangement data of FIG. 14 using the method of FIG. 13 according to an exemplary embodiment of the inventive concept.

DETAILED DESCRIPTION OF EMBODIMENTS

Figure 1:
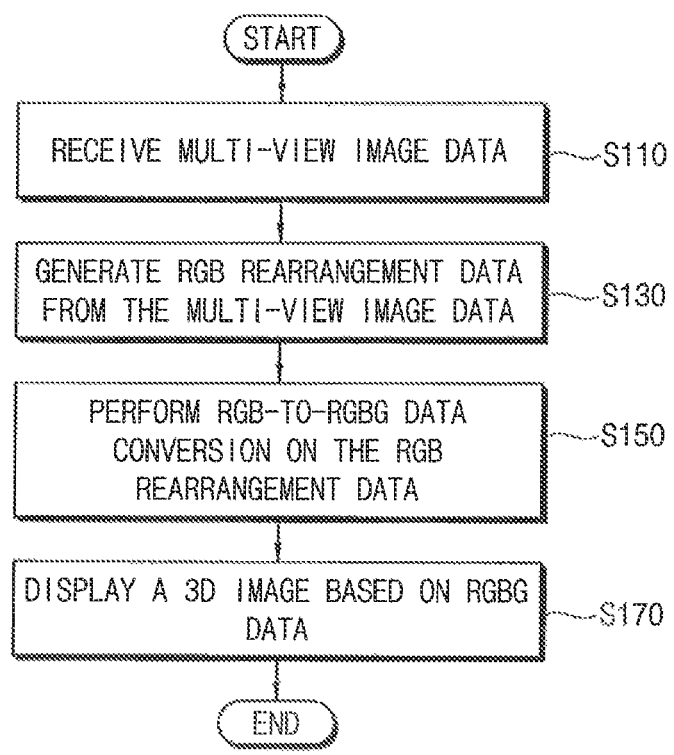
FIG. 1 is a flowchart illustrating a method of operating a light field three-dimensional (3D) display device having an RGBG pixel structure according to an exemplary embodiment of the inventive concept.

Exemplary embodiments of the inventive concept provide a method of operating a light field three-dimensional (3D) display device having an RGBG pixel structure.

Exemplary embodiments of the inventive concept also provide a 3D display device having the light field 3D display device having the RGBG pixel structure capable of displaying a 3D image.

Exemplary embodiments of the inventive concept will be described more fully hereinafter with reference to the accompanying drawings. Like or similar reference numerals refer to like or similar elements throughout this application.

FIG. 1 is a flowchart illustrating a method of operating a light field three-dimensional (3D) display device having an RGBG pixel structure according to an exemplary embodiment of the inventive concept.

Referring to FIG. 1, in a method of operating a light field 3D display device having an RGBG pixel structure, multi-view image data including RGB data at multiple points of view may be received (S110). The multi-view image data may be, but is not limited to, image data obtained by a plurality of cameras located at positions corresponding to the multiple points of view, or image data generated based on 3D modeling by a graphic processor. For example, the multi-view image data may include first through N-th view point RGB data, where N is an integer greater than or equal to 4.

The light field 3D display device may generate RGB rearrangement data from the multi-view image data by considering RGB-to-RGBG data conversion to be performed and displaying of a 3D image at a display panel having the RGBG pixel structure (S130). For example, the light field 3D display device may generate the RGB rearrangement data including R sub-pixel data, G sub-pixel data, and B sub-pixel data from the multi-view image data by extracting two adjacent ones of the R sub-pixel data at the same pixel row from the RGB data at the same point of view among the multi-view image data, by extracting two adjacent ones of the G sub-pixel data at the same pixel row from the RGB data at different points of view among the multi-view image data, and by extracting two adjacent ones of the B sub-pixel data at the same pixel row from the RGB data at the same point of view among the multi-view image data. Accordingly, since the two adjacent ones of the R sub-pixel data (or the two adjacent ones of the B sub-pixel data) in the RGB rearrangement data, to be converted by the RGB-to-RGBG data conversion into one R sub-pixel data (or one B sub-pixel data) in RGBG data, are extracted from the RGB data at the same point of view, data at different points of view may not be mixed at the one R sub-pixel data (or the one B sub-pixel data) in the RGBG data.

Further, the light field 3D display device may extract R and B sub-pixel data at an odd-numbered pixel row and R and B sub-pixel data at an even-numbered pixel row in the RGB rearrangement data from the RGB data at alternating points of views. For example, among the RGB rearrangement data, the two adjacent ones of the R sub-pixel data at an odd-numbered pixel row and adjacent first and second pixel columns, and the two adjacent ones of the B sub-pixel data at an even-numbered pixel row adjacent to the odd-numbered pixel row and the first and second pixel columns may be extracted from the RGB data at the same point of view among the multi-view image data. Accordingly, since the two adjacent ones of the R sub-pixel data at the odd-numbered pixel row and the two adjacent ones of the B sub-pixel data at the even-numbered pixel row, to be converted by the RGB-to-RGBG data conversion into one R sub-pixel data and one B sub-pixel data at the same pixel column in RGBG data, are extracted from the RGB data at the same point of view, data at different points of view may not be mixed at the same pixel column in the RGBG data. Further, among the RGB rearrangement data, the two adjacent ones of the B sub-pixel data at the odd-numbered pixel row and adjacent first and second pixel columns, and the two adjacent ones of the G sub-pixel data at the even-numbered pixel row adjacent to the odd-numbered pixel row and the first and second pixel columns may be extracted from the RGB data at the same point of view among the multi-view image data. Accordingly, since the two adjacent ones of the B sub-pixel data at the odd-numbered pixel row and the two adjacent ones of the G sub-pixel data at the even-numbered pixel row, to be converted by the RGB-to-RGBG data conversion into one B sub-pixel data and one G sub-pixel data at the same pixel column in RGBG data, are extracted from the RGB data at the same point of view, data at different points of view may not be mixed at the same pixel column in the RGBG data.

The light field 3D display device may generate the RGBG data by performing the RGB-to-RGBG data conversion on the RGB rearrangement data (S150). The light field 3D display device may average (or calculate an average of) the two adjacent ones of the R sub-pixel data in the RGB rearrangement data to generate one R sub-pixel data in the RGBG data, may generate each G sub-pixel data in the RGBG data that is substantially the same as the G sub-pixel data in the RGB rearrangement data, and may average (or calculate an average of) the two adjacent ones of the B sub-pixel data in the RGB rearrangement data to generate one B sub-pixel data in the RGBG data.

For example, the light field 3D display device may average the two adjacent ones of the R sub-pixel data at a first pixel row and adjacent first and second pixel columns among the RGB rearrangement data to generate first R sub-pixel data at the first pixel row and the first pixel column among the RGBG data, may generate first G sub-pixel data at the first pixel row and the first pixel column among the RGBG data that is substantially the same as the G sub-pixel data at the first pixel row and the first pixel column among the RGB rearrangement data, may average the two adjacent ones of the B sub-pixel data at the first pixel row and the first and second pixel columns among the RGB rearrangement data to generate first B sub-pixel data at the first pixel row and the second pixel column among the RGBG data, and may generate second G sub-pixel data at the first pixel row and the second pixel column among the RGBG data that is substantially the same as the G sub-pixel data at the first pixel row and the second pixel column among the RGB rearrangement data.

Further, the light field 3D display device may average the two adjacent ones of the B sub-pixel data at a second pixel row adjacent to the first pixel row and the first and second pixel columns among the RGB rearrangement data to generate second B sub-pixel data at the second pixel row and the first pixel column among the RGBG data, may generate third G sub-pixel data at the second pixel row and the first pixel column among the RGBG data that is substantially the same as the G sub-pixel data at the second pixel row and the first pixel column among the RGB rearrangement data, may average the two adjacent ones of the R sub-pixel data at the second pixel row and the first and second pixel columns among the RGB rearrangement data to generate second R sub-pixel data at the second pixel row and the second pixel column among the RGBG data, and may generate fourth G sub-pixel data at the second pixel row and the second pixel column among the RGBG data that is substantially the same as the G sub-pixel data at the second pixel row and the second pixel column among the RGB rearrangement data.

The light field 3D display device may display a 3D image based on the RGBG data (S170).

As described above, the method of operating the light field 3D display device having the RGBG pixel structure according to exemplary embodiments of the inventive concept may generate the RGB rearrangement data from the multi-view image data by considering the RGB-to-RGBG data conversion and the RGBG pixel structure, and thus the light field 3D display device having the RGBG pixel structure may accurately display the 3D image.

Figure 2:
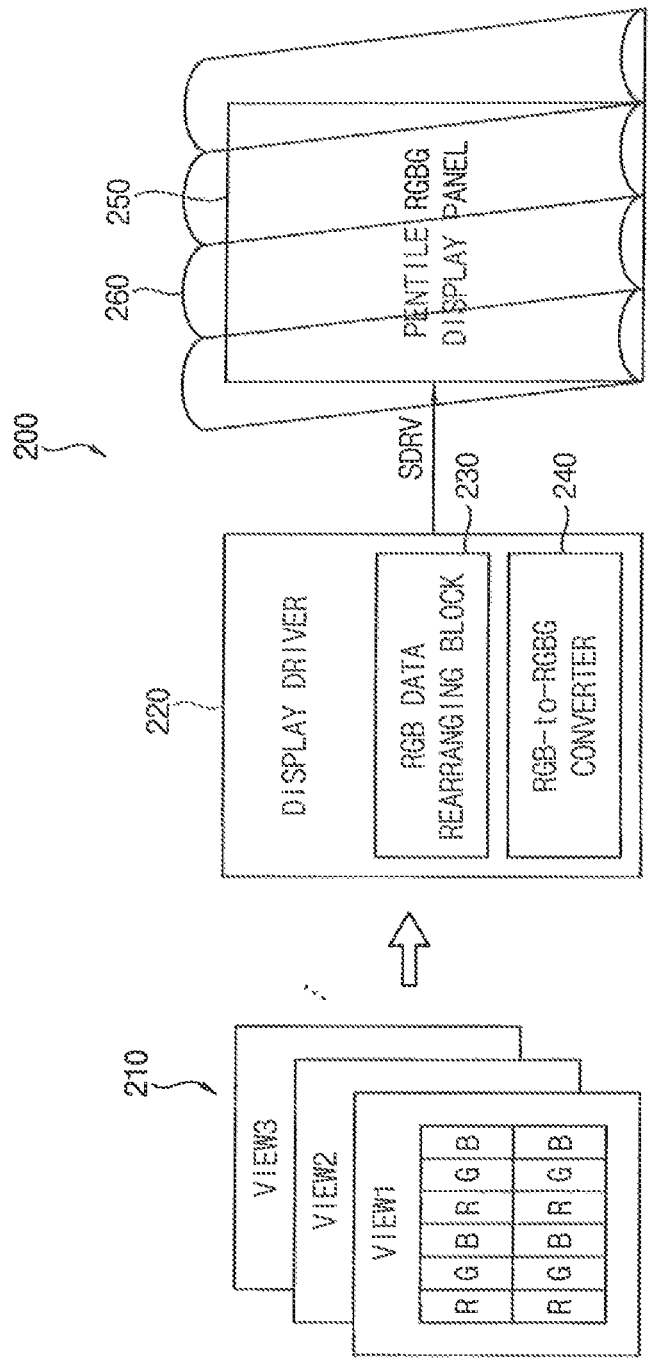
FIG. 2 is a block diagram illustrating a light field 3D display device having an RGBG pixel structure according to an exemplary embodiment of the inventive concept.
Figure 3:
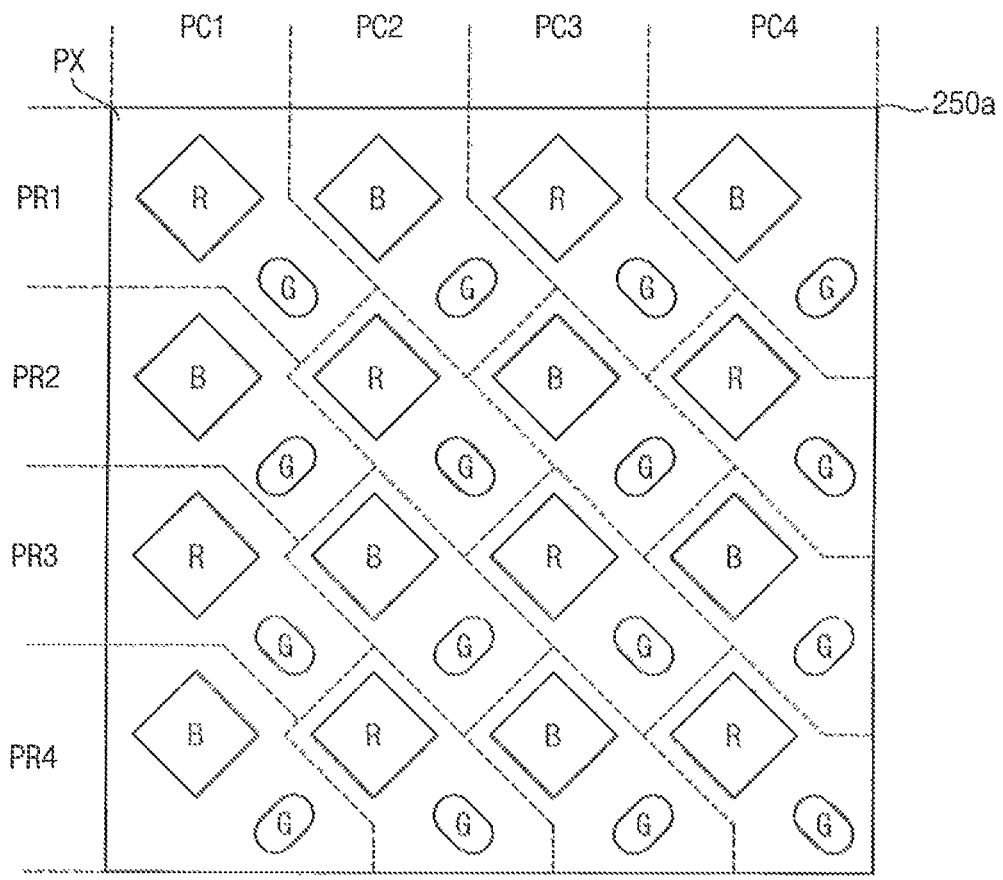
FIG. 3 is a diagram illustrating a display panel included in the light field 3D display device of FIG. 2 according to an exemplary embodiment of the inventive concept.
Figure 4:
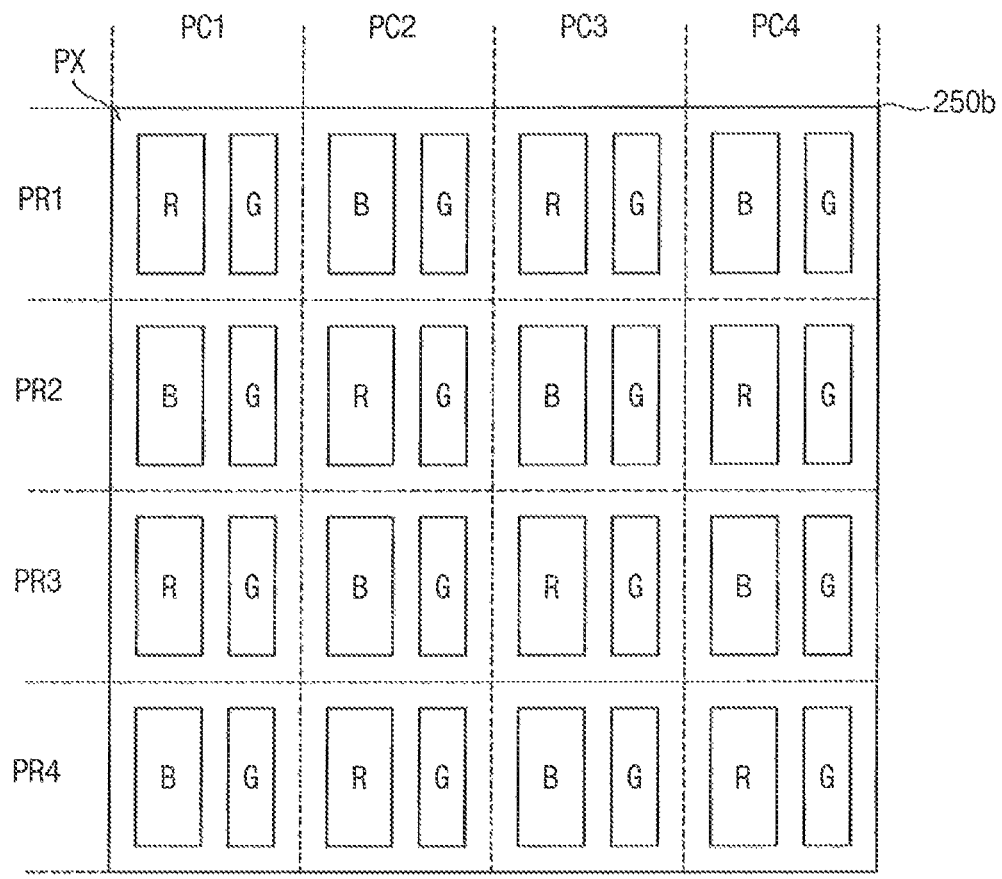
FIG. 4 is a diagram illustrating a display panel included in the light field 3D display device of FIG. 2 according to an exemplary embodiment of the inventive concept.
Figure 5:
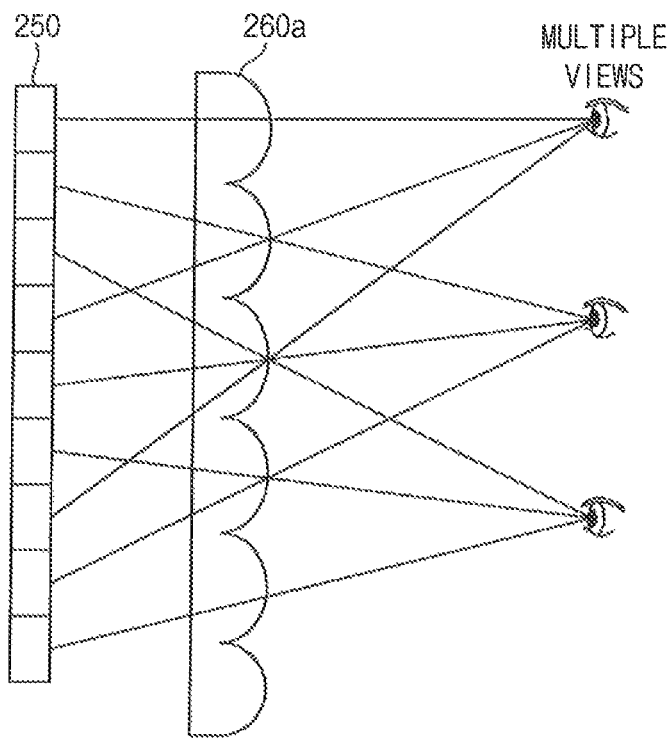
FIG. 5 is a diagram illustrating an optical device included in the light field 3D display device of FIG. 2 according to an exemplary embodiment of the inventive concept.
Figure 6:
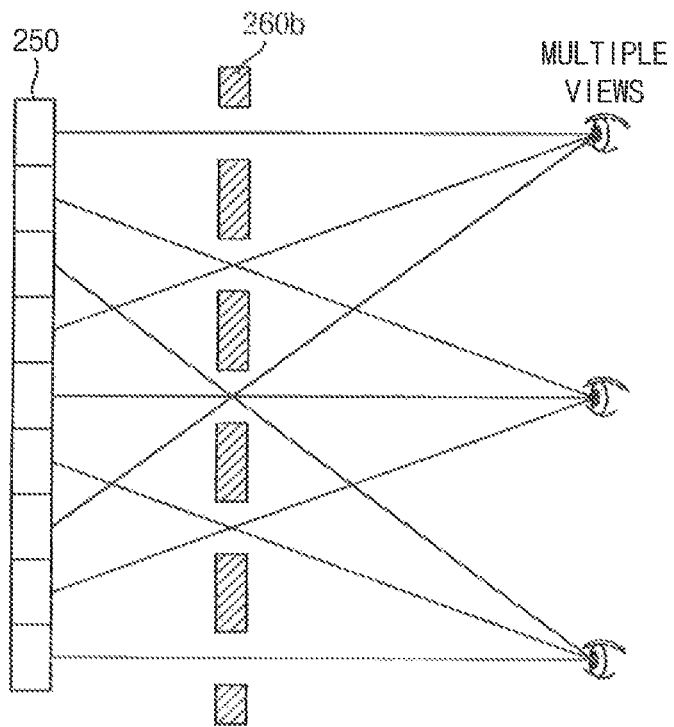
FIG. 6 is a diagram illustrating an optical device included in the light field 3D display device of FIG. 2 according to an exemplary embodiment of the inventive concept.

FIG. 2 is a block diagram illustrating a light field 3D display device having an RGBG pixel structure according to an exemplary embodiment of the inventive concept, FIG. 3 is a diagram illustrating a display panel included in the light field 3D display device of FIG. 2, FIG. 4 is a diagram illustrating a display panel included in the light field 3D display device of FIG. 2, FIG. 5 is a diagram illustrating an optical device included in the light field 3D display device of FIG. 2, and FIG. 6 is a diagram illustrating an optical device included in the light field 3D display device of FIG. 2.

Referring to FIG. 2, a light field 3D display device 200 includes a display panel 250 having an RGBG pixel structure, an optical device 260 which controls directions of light rays generated by the display panel 250, and a display driver 220 which drives the display panel 250 to display a 3D image.

The display panel 250 may be a pentile RGBG display panel having the RGBG pixel structure. Each pixel of the display panel 250 may include two sub-pixels of different colors. For example, each pixel of the display panel 250 may include one R sub-pixel and one G sub-pixel, or may include one B sub-pixel and one G sub-pixel.

In an exemplary embodiment of the inventive concept, the display panel 250 may be a diamond pentile display panel 250a as illustrated in FIG. 3. In the diamond pentile display panel 250a, one R sub-pixel, two G sub-pixels, and one B sub-pixel may be adjacently located at four vertices of a diamond shape. Further, in the diamond pentile display panel 250a, one R sub-pixel and one G sub-pixel may be disposed in a diagonal direction within one pixel PX, or one B sub-pixel and one G sub-pixel may be disposed in a diagonal direction within one pixel PX. The R sub-pixel, the G sub-pixel, the B sub-pixel, and the G sub-pixel may be sequentially disposed in odd-numbered pixel rows PR1 and PR3 of the diamond pentile display panel 250a, and the B sub-pixel, the G sub-pixel, the R sub-pixel, and the G sub-pixel may be sequentially disposed in even-numbered pixel rows PR2 and PR4 of the diamond pentile display panel 250a. Further, the R sub-pixel, the G sub-pixel, the B sub-pixel, and the G sub-pixel may be sequentially disposed in odd-numbered pixel columns PC1 and PC3 of the diamond pentile display panel 250a, and the B sub-pixel, the G sub-pixel, the R sub-pixel, and the G sub-pixel may be sequentially disposed in even-numbered pixel columns PC2 and PC4 of the diamond pentile display panel 250a. In the diamond pentile display panel 250a, each G sub-pixel may have a size smaller than that of the R sub-pixel or the B sub-pixel. Further, each of the R sub-pixel and the B sub-pixel may have a diamond shape, and the G sub-pixel may have an oval (or elliptical) shape. However, arrangements, sizes, and shapes of the R sub-pixel, the G sub-pixel, and the B sub-pixel may not be limited to those described above.

In an exemplary embodiment of the inventive concept, the display panel 250 may be a pentile display panel 250b as illustrated in FIG. 4. In the pentile display panel 250b, each pixel PX may include an R sub-pixel having a rectangular shape and a G sub-pixel having a rectangular shape smaller than the R sub-pixel, or may include a B sub-pixel having a rectangular shape and a G sub-pixel having a rectangular shape smaller than the B sub-pixel. The R sub-pixel, the G sub-pixel, the B sub-pixel, and the G sub-pixel may be sequentially disposed in odd-numbered pixel rows PR1 and PR3 of the pentile display panel 250b, and the B sub-pixel, the G sub-pixel, the R sub-pixel, and the G sub-pixel may be sequentially disposed in even-numbered pixel rows PR2 and PR4 of the pentile display panel 250b. Further, the R sub-pixel, the G sub-pixel, the B sub-pixel, and the G sub-pixel may be sequentially disposed in odd-numbered pixel columns PC1 and PC3 of the pentile display panel 250b, and the B sub-pixel, the G sub-pixel, the R sub-pixel, and the G sub-pixel may be sequentially disposed in even-numbered pixel columns PC2 and PC4 of the pentile display panel 250b. However, arrangements, sizes, and shapes of the R sub-pixel, the G sub-pixel, and the B sub-pixel may not be limited to those described above.

The optical device 260 may control directions of light rays generated by sub-pixels of the display panel 250. In an exemplary embodiment of the inventive concept, the optical device 260 may be a lenticular lens 260a as illustrated in FIG. 5. The directions of the light rays emitted by the sub-pixels of the display panel 250 may be controlled by the lenticular lens 260a to display a multi-view 3D image. In an exemplary embodiment of the inventive concept, the optical device 260 may be a parallex barrier 260b as illustrated in FIG. 6. The directions of the light rays emitted by the sub-pixels of the display panel 250 may be controlled by the parallex barrier 260b to display a multi-view 3D image. In exemplary embodiments of the inventive concept, the optical device 260 may be, but is not limited to, a lens array, a micro lens array, etc.

The display driver 220 may receive multi-view image data 210 including RGB data at multiple points of view VIEW1, VIEW2, and VIEW3, and may drive the display panel 250 to display a 3D image by providing the display panel 250 with a driving signal SDRV corresponding to RGBG data. To generate the RGBG data suitable for the display panel 250 having the RGBG pixel structure and displaying the 3D image, the display driver 220 may include an RGB data rearranging block 230 and an RGB-to-RGBG converter 240.

The RGB data rearranging block 230 may generate RGB rearrangement data by considering RGB-to-RGBG data conversion to be performed by the RGB-to-RGBG converter 240 and displaying of the 3D image at the display panel 250 having the RGBG pixel structure. For example, the RGB data rearranging block 230 may generate the RGB rearrangement data including R sub-pixel data, G sub-pixel data, and B sub-pixel data from the multi-view image data 210 by extracting two adjacent ones of the R sub-pixel data at a same pixel row from the RGB data at a same point of view among the multi-view image data 210, by extracting two adjacent ones of the G sub-pixel data at a same pixel row from the RGB data at different points of view among the multi-view image data 210, and by extracting two adjacent ones of the B sub-pixel data at a same pixel row from the RGB data at a same point of view among the multi-view image data 210. Further, the RGB data rearranging block 230 may extract the R and B sub-pixel data at an odd-numbered pixel row and the R and B sub-pixel data at an even-numbered pixel row in the RGB rearrangement data from the RGB data at alternating points of views.

The RGB-to-RGBG converter 240 may generate the RGBG data by performing the RGB-to-RGBG data conversion on the RGB rearrangement data. The display driver 220 may drive the display panel 250 by generating the driving signal SDRV corresponding to the RGBG data. As described above, since the RGB rearrangement data are generated by considering the RGB-to-RGBG data conversion and the RGBG pixel structure, the RGBG data converted from the RGB rearrangement data may be suitable for the display panel 250 having the RGBG pixel structure and displaying the 3D image, and the display device 200 may accurately display the 3D image.

Figure 7:
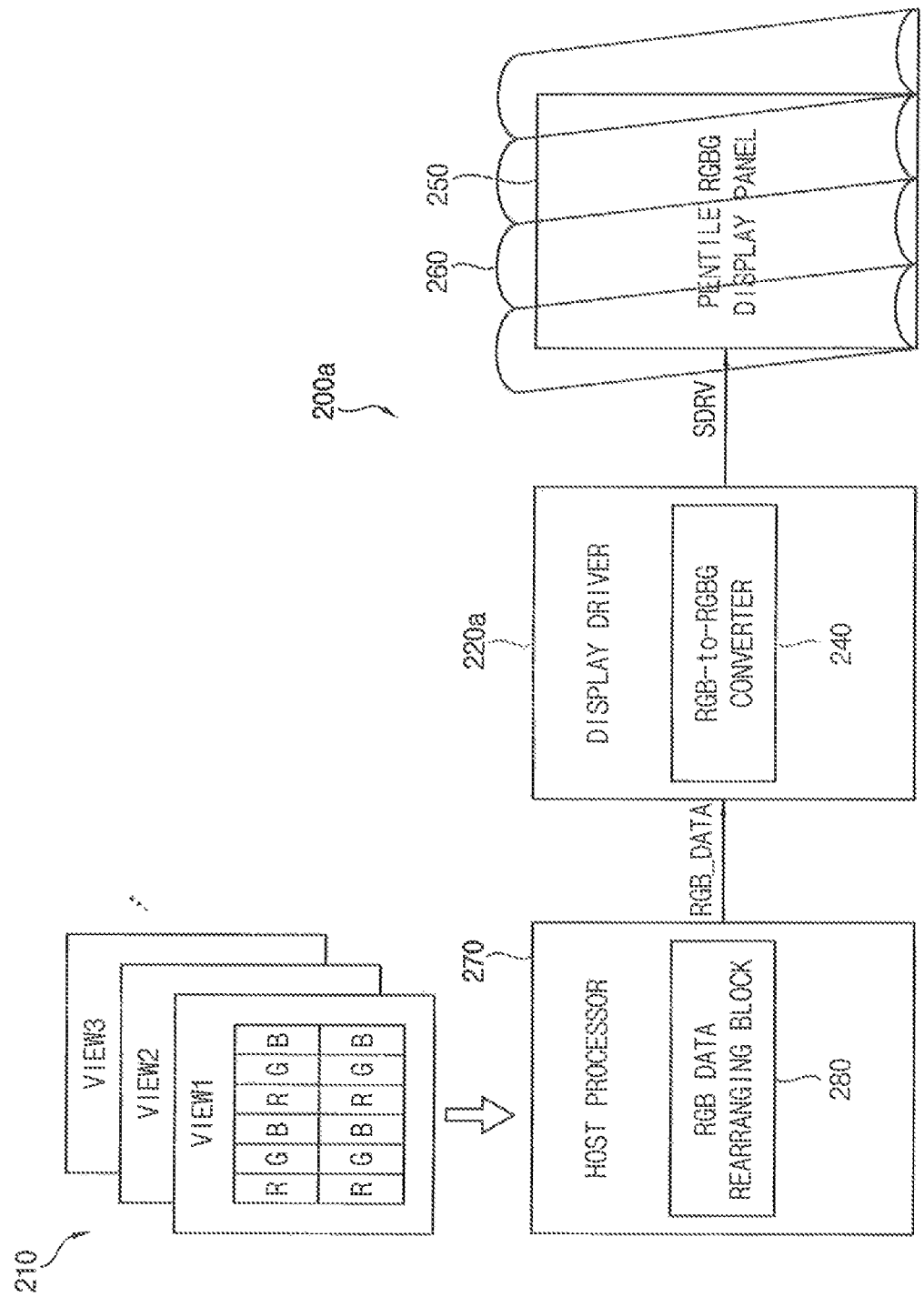
FIG. 7 is a block diagram illustrating a light field 3D display device having an RGBG pixel structure according to an exemplary embodiment of the inventive concept.

FIG. 7 is a block diagram illustrating a light field 3D display device having an RGBG pixel structure according to an exemplary embodiment of the inventive concept.

A light field 3D display device 200a of FIG. 7 may have similar configurations and operations as the light field 3D display device 200 of FIG. 2, except that a display driver 220a may not include an RGB rearrangement block. In FIG. 7, generating RGB rearrangement data may be performed by a host processor 270 that controls the light field 3D display device 200a, and RGB-to-RGBG data conversion may be performed by the display driver 220a included in the light field 3D display device 200a.

Referring to FIG. 7, the host processor 270 (e.g., an application processor (AP), a graphic processing unit (GPU), etc.) may include an RGB data rearranging block 280 that receives multi-view image data 210 and generates the RGB rearrangement data from the multi-view image data 210 by considering RGB-to-RGBG data conversion to be performed by the RGB-to-RGBG converter 240 and displaying of an 3D image at the display panel 250 having an RGBG pixel structure. The display driver 220a may include the RGB-to-RGBG converter 240 that receives the RGB rearrangement data and generates RGBG data by performing the RGB-to-RGBG data conversion on the RGB rearrangement data. The display driver 220a may drive the display panel 250 by generating the driving signal SDRV corresponding to the RGBG data.

Figure 8:
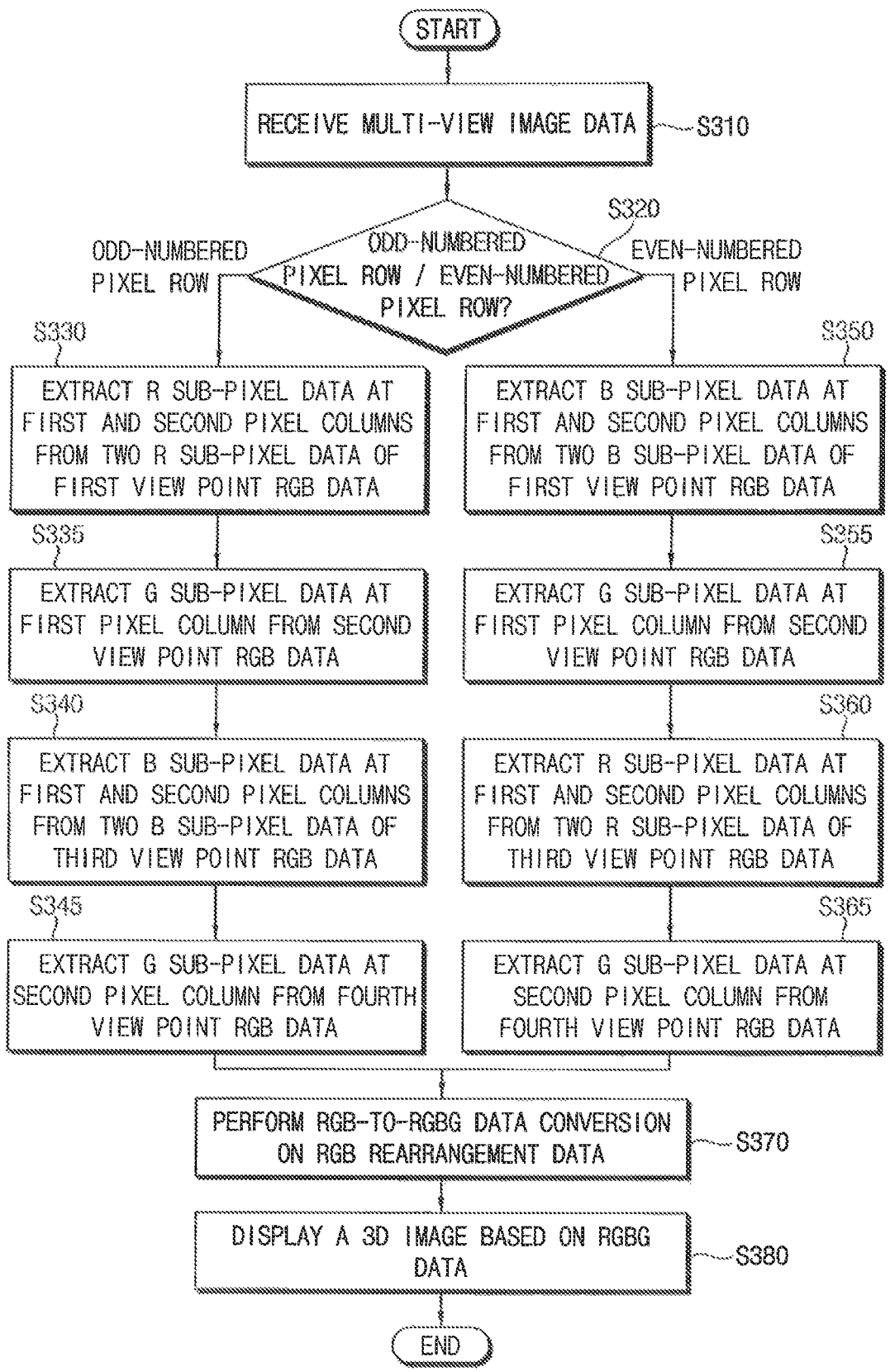
FIG. 8 is a flowchart illustrating a method of operating a light field 3D display device having an RGBG pixel structure according to an exemplary embodiment of the inventive concept.
Figure 9:
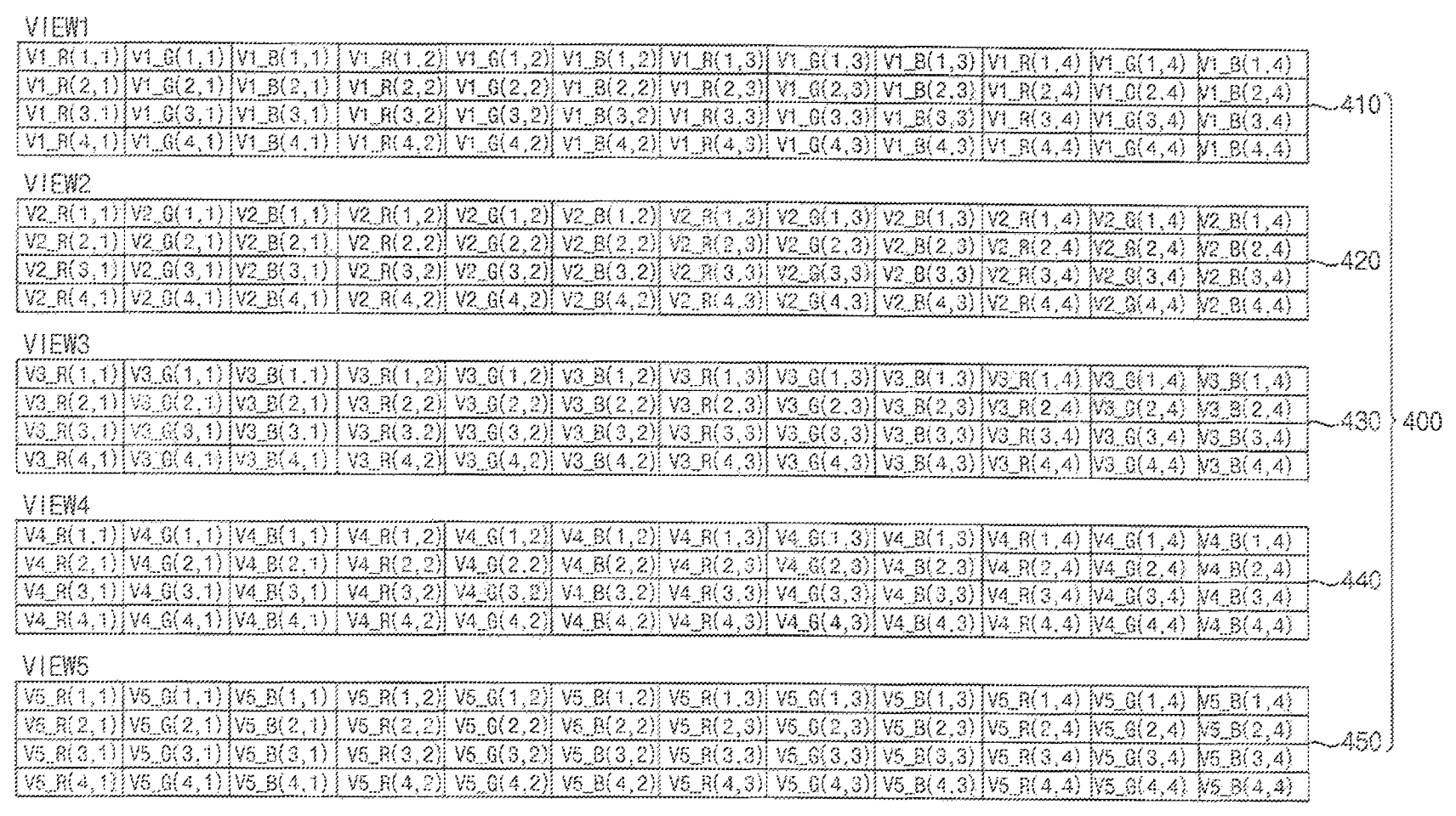
Figure 12:
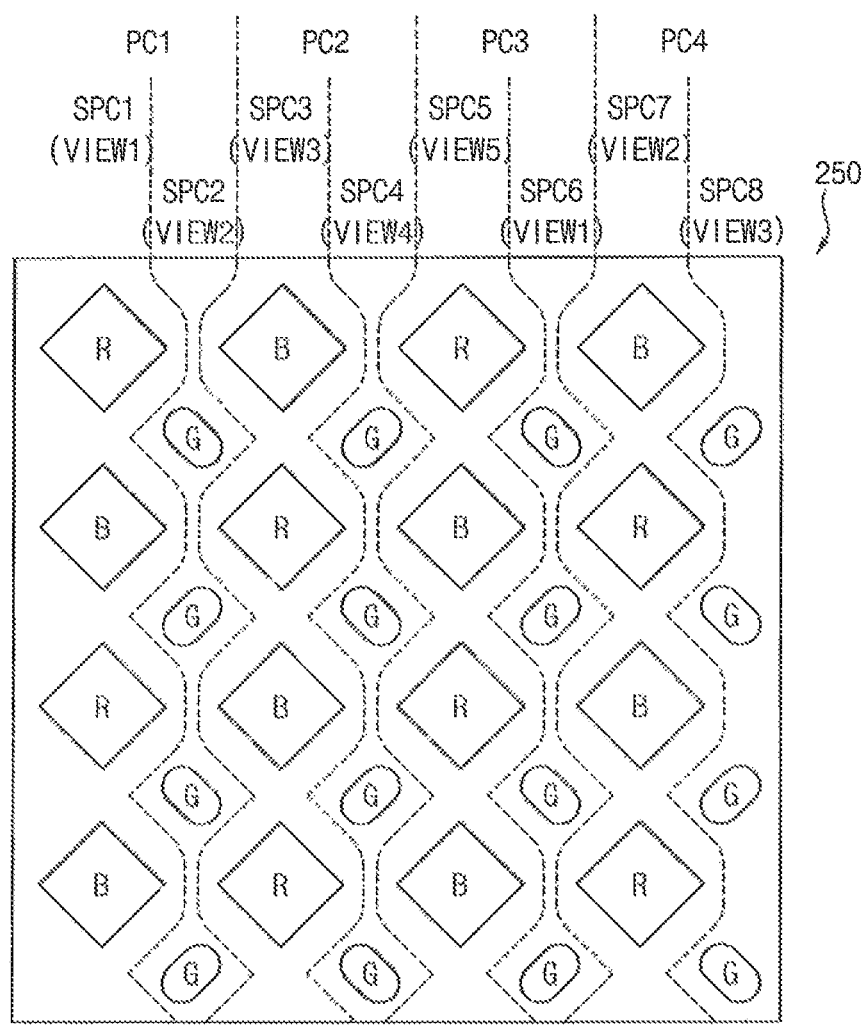
FIG. 12 is a diagram for describing points of view displayed at a display panel according to the method of FIG. 8 according to an exemplary embodiment of the inventive concept.

FIG. 8 is a flowchart illustrating a method of operating a light field 3D display device having an RGBG pixel structure according to an exemplary embodiment of the inventive concept, FIG. 9 is a diagram illustrating an example of multi-view image data including RGB data at multiple points of view, FIG. 10 is a diagram illustrating an example of RGB rearrangement data generated from the multi-view image data of FIG. 9 using the method of FIG. 8, FIG. 11 is a diagram illustrating an example of RGBG data converted from the RGB rearrangement data of FIG. 10 using the method of FIG. 8, and FIG. 12 is a diagram for describing points of view displayed at a display panel according to the method of FIG. 8.

Referring to FIG. 8, in a method of operating a light field 3D display device having an RGBG pixel structure, multi-view image data including RGB data at multiple points of view may be received (S310). For example, as illustrated in FIG. 9, the light field 3D display device may receive the multi-view image data 400 including first view point RGB data 410, second view point RGB data 420, third view point RGB data 430, fourth view point RGB data 440, and fifth view point RGB data 450.

The light field 3D display device may generate RGB rearrangement data from the multi-view image data by considering RGB-to-RGBG data conversion to be performed and displaying of a 3D image at a display panel having the RGBG pixel structure (S320 through S365). The light field 3D display device may extract two adjacent R sub-pixel data (and/or two adjacent B sub-pixel data) at the same pixel row from the RGB data at the same point of view among the multi-view image data, and may extract R and B sub-pixel data at an odd-numbered pixel row and R and B sub-pixel data at an even-numbered pixel row in the RGB rearrangement data from the RGB data at alternating points of views.

In an exemplary embodiment of the inventive concept, with respect to a first pixel row that is the odd-numbered pixel row (S320: ODD-NUMBERED PIXEL ROW), first and second R sub-pixel data at the first pixel row and adjacent first and second pixel columns among the RGB rearrangement data may be extracted from the first view point RGB data 410 (S330). For example, as illustrated in FIGS. 9 and 10, the first R sub-pixel data of RGB rearrangement data 460 may be extracted from R sub-pixel data (e.g., "V1_R(1,1)") at the first pixel row and the first pixel column in the first view point RGB data 410, and the second R sub-pixel data of the RGB rearrangement data 460 may be extracted from R sub-pixel data (e.g., "V1_R(1,2)") at the first pixel row and the second pixel column in the first view point RGB data 410.

First G sub-pixel data at the first pixel row and the first pixel column among the RGB rearrangement data 460 may be extracted from the second view point RGB data 420 (S335). For example, as illustrated in FIGS. 9 and 10, the first G sub-pixel data of the RGB rearrangement data 460 may be extracted from G sub-pixel data (e.g., "V2_G(1,1)") at the first pixel row and the first pixel column in the second view point RGB data 420.

First and second B sub-pixel data at the first pixel row and the first and second pixel columns among the RGB rearrangement data 460 may be extracted from the third view point RGB data 430 (S340). For example, as illustrated in FIGS. 9 and 10, the first B sub-pixel data of the RGB rearrangement data 460 may be extracted from B sub-pixel data (e.g., "V3_B(1,1)") at the first pixel row and the first pixel column in the third view point RGB data 430, and the second B sub-pixel data of the RGB rearrangement data 460 may be extracted from B sub-pixel data (e.g., "V3_B(1,2)") at the first pixel row and the second pixel column in the third view point RGB data 430.

Second G sub-pixel data at the first pixel row and the second pixel column among the RGB rearrangement data may be extracted from the fourth view point RGB data 440 (S345). For example, as illustrated in FIGS. 9 and 10, the second G sub-pixel data of the RGB rearrangement data 460 may be extracted from G sub-pixel data (e.g., "V4_G(1,2)") at the first pixel row and the second pixel column in the fourth view point RGB data 440.

With respect to a second pixel row that is adjacent to the first pixel row and is the even-numbered pixel row (S320: EVEN-NUMBERED PIXEL ROW), third and fourth B sub-pixel data at the second pixel row and the first and second pixel columns among the RGB rearrangement data 460 may be extracted from the first view point RGB data 410 (S350). For example, as illustrated in FIGS. 9 and 10, the third B sub-pixel data of the RGB rearrangement data 460 may be extracted from B sub-pixel data (e.g., "V1_B(2,1)") at the second pixel row and the first pixel column in the first view point RGB data 410, and the fourth B sub-pixel data of the RGB rearrangement data 460 may be extracted from B sub-pixel data (e.g., "V1_B(2,2)") at the second pixel row and the second pixel column in the first view point RGB data 410.

Third G sub-pixel data at the second pixel row and the first pixel column among the RGB rearrangement data 460 may be extracted from the second view point RGB data 420 (S355). For example, as illustrated in FIGS. 9 and 10, the third G sub-pixel data of the RGB rearrangement data 460 may be extracted from G sub-pixel data (e.g., "V2_G(2,1)") at the second pixel row and the first pixel column in the second view point RGB data 420.

Third and fourth R sub-pixel data at the second pixel row and the first and second pixel columns among the RGB rearrangement data 460 may be extracted from the third view point RGB data 430 (S360). For example, as illustrated in FIGS. 9 and 10, the third R sub-pixel data of the RGB rearrangement data 460 may be extracted from R sub-pixel data (e.g., "V3_R(2,1)") at the second pixel row and the first pixel column in the third view point RGB data 430, and the fourth R sub-pixel data of the RGB rearrangement data 460 may be extracted from R sub-pixel data (e.g., "V3_R(2,2)") at the second pixel row and the second pixel column in the third view point RGB data 430.

Fourth G sub-pixel data at the second pixel row and the second pixel column among the RGB rearrangement data may be extracted from the first view point RGB data 440 (S365). For example, as illustrated in FIGS. 9 and 10, the fourth G sub-pixel data of the RGB rearrangement data 460 may be extracted from G sub-pixel data (e.g., "V4_G(2,2)") at the second pixel row and the second pixel column in the fourth view point RGB data 440.

The light field 3D display device may generate RGBG data as illustrated in FIG. 11 by performing RGB-to-RGBG data conversion on the RGB rearrangement data 460 (S370). The light field 3D display device may average (or calculate an average of) two adjacent R sub-pixel data in the RGB rearrangement data 460 to generate one R sub-pixel data in RGBG data 470, may generate each G sub-pixel data in the RGBG data 470 that is substantially the same as the G sub-pixel data in the RGB rearrangement data 460, and may average (or calculate an average of) two adjacent B sub-pixel data in the RGB rearrangement data 460 to generate one B sub-pixel data in the RGBG data 470.

For example, as illustrated in FIGS. 10 and 11, two R sub-pixel data (e.g., "V1_R(1,1)" and "V1_R(1,2)") at the first pixel row and the first and second pixel columns in the RGB rearrangement data 460 may be averaged to generate first R sub-pixel data (e.g., "(V1_R(1,1)+V1_R(1,2))/2" at the first pixel row and the first pixel column in the RGBG data 470, G sub-pixel data (e.g., "V2_G(1,1)") at the first pixel row and the first pixel column in the RGB rearrangement data 460 may be used as first G sub-pixel data (e.g., "V2_G(1,1)") at the first pixel row and the first pixel column in the RGBG data 470, two B sub-pixel data (e.g., "V3_B(1,1)" and "V3_B(1,2)") at the first pixel row and the first and second pixel columns in the RGB rearrangement data 460 may be averaged to generate first B sub-pixel data (e.g., "(V3_B(1,1)+V3_B(1,2))/2" at the first pixel row and the first pixel column in the RGBG data 470, and G sub-pixel data (e.g., "V4_G(1,2)") at the first pixel row and the second pixel column in the RGB rearrangement data 460 may be used as second G sub-pixel data (e.g., "V4_G(1,2)") at the first pixel row and the second pixel column in the RGBG data 470.

Further, two B sub-pixel data (e.g., "V1_B(2,1)" and "V1_B(2,2)") at the second pixel row and the first and second pixel columns in the RGB rearrangement data 460 may be averaged to generate second B sub-pixel data (e.g., "(V1_B(2,1)+V1_B(2,2))/2" at the second pixel row and the first pixel column in the RGBG data 470, G sub-pixel data (e.g., "V2_G(2,1)") at the second pixel row and the first pixel column in the RGB rearrangement data 460 may be used as third G sub-pixel data (e.g., "V2_G(2,1)") at the second pixel row and the first pixel column in the RGBG data 470, two R sub-pixel data (e.g., "V3_R(2,1)" and "V3_R(2,2)") at the second pixel row and the first and second pixel columns in the RGB rearrangement data 460 may be averaged to generate second R sub-pixel data (e.g., "(V3_R(2,1)+V3_R(2,2))/2" at the second pixel row and the first pixel column in the RGBG data 470, and G sub-pixel data (e.g., "V4_G(2,2)") at the second pixel row and the second pixel column in the RGB rearrangement data 460 may be used as fourth G sub-pixel data (e.g., "V4_G(2,2)") at the second pixel row and the second pixel column in the RGBG data 470.

The light field 3D display device may display a 3D image based on the RGBG data 470 (S380). Since the RGBG data 470 include only sub-pixel data at the same point of view at each sub-pixel column, the 3D image may be accurately displayed. For example, as illustrated in FIG. 12, a display panel 250 of the light field 3D display device may display an image of a first point of view VIEW1 at a first sub-pixel column SPC1 of a first pixel column PC1, may display an image of a second point of view VIEW2 at a second sub-pixel column SPC2 of the first pixel column PC1, may display an image of a third point of view VIEW3 at a third sub-pixel column SPC3 of a second pixel column PC2, may display an image of a fourth point of view VIEW4 at a fourth sub-pixel column SPC4 of the second pixel column PC2, may display an image of a fifth point of view VIEW5 at a fifth sub-pixel column SPC5 of a third pixel column PC3, may display the image of the first point of view VIEW1 at a sixth sub-pixel column SPC6 of the third pixel column PC3, may display the image of the second point of view VIEW2 at a seventh sub-pixel column SPC7 of a fourth pixel column PC4, and may display the image of the third point of view VIEW3 at an eighth sub-pixel column SPC8 of the fourth pixel column PC4. In other words, the display panel 250 having an RGBG pixel structure may display the image at the same point of view at each sub-pixel column SPC1 through SPC8, and thus may accurately display the 3D image.

Figure 13:
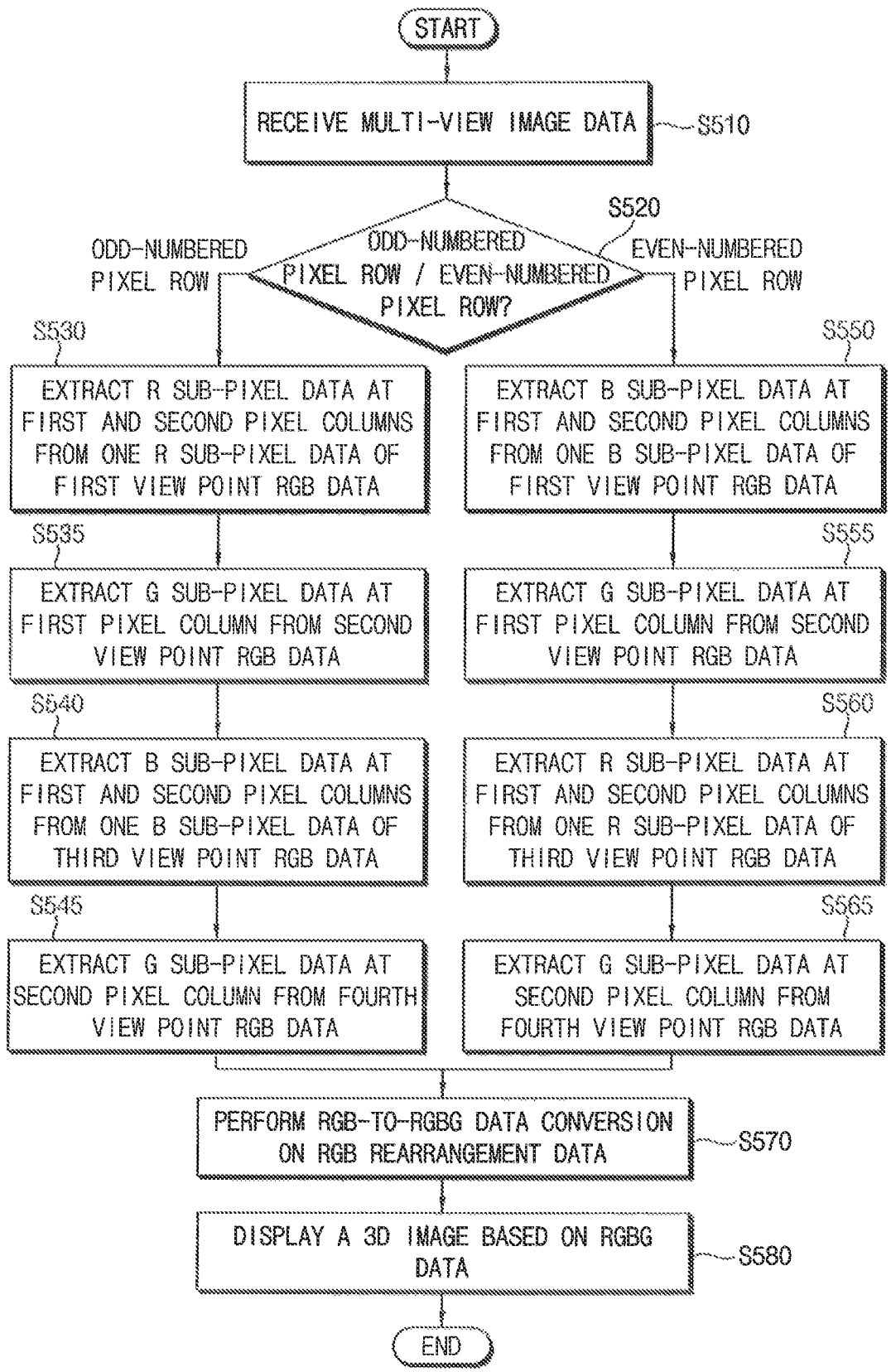
FIG. 13 is a flowchart illustrating a method of operating a light field 3D display device having an RGBG pixel structure according to an exemplary embodiment of the inventive concept.
Figure 15:
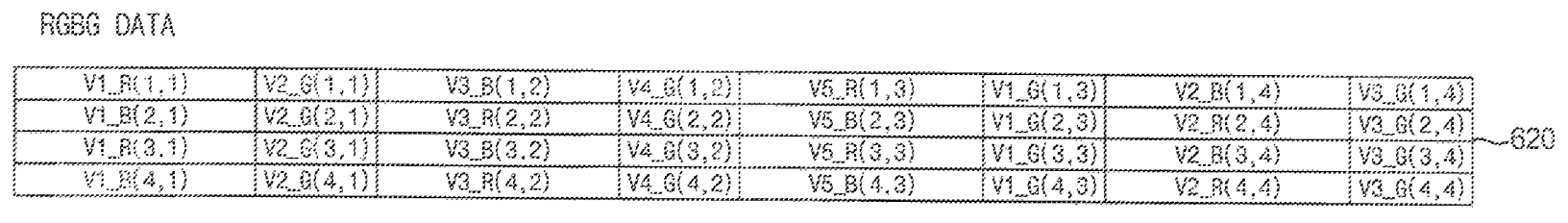

FIG. 13 is a flowchart illustrating a method of operating a light field 3D display device having an RGBG pixel structure according to an exemplary embodiment of the inventive concept, FIG. 14 is a diagram illustrating an example of RGB rearrangement data generated from the multi-view image data of FIG. 9 using the method of FIG. 13, and FIG. 15 is a diagram illustrating an example of RGBG data converted from the RGB rearrangement data of FIG. 14 using the method of FIG. 13.

Referring to FIGS. 9, and 13 through 15, in a method of operating a light field 3D display device having an RGBG pixel structure, the multi-view image data 400 including the RGB data 410, 420, 430, 440, and 450 at multiple points of view VIEW1, VIEW2, VIEW3, VIEW4, and VIEW5 may be received (S510).

The light field 3D display device may generate RGB rearrangement data 610 from the multi-view image data 400 by considering RGB-to-RGBG data conversion to be performed and displaying of a 3D image at a display panel having the RGBG pixel structure (S520 through S565). The light field 3D display device may extract two adjacent R sub-pixel data (and/or two adjacent B sub-pixel data) at the same pixel row in the RGB rearrangement data 610 from the RGB data at the same point of view among the multi-view image data 400, and may extract R and B sub-pixel data at an odd-numbered pixel row and R and B sub-pixel data at an even-numbered pixel row in the RGB rearrangement data 610 from the RGB data at alternating points of views among the multi-view image data 400.

In an exemplary embodiment of the inventive concept, with respect to a first pixel row that is the odd-numbered pixel row (S520: ODD-NUMBERED PIXEL ROW), first and second R sub-pixel data at the first pixel row and adjacent first and second pixel columns among the RGB rearrangement data 610 may be extracted from one R sub-pixel data in the first view point RGB data 410 (S530). For example, as illustrated in FIGS. 9 and 14, the first R sub-pixel data of the RGB rearrangement data 610 may be extracted from R sub-pixel data (e.g., "V1_R(1,1)") at the first pixel row and the first pixel column in the first view point RGB data 410, and the second R sub-pixel data of the RGB rearrangement data 610 may be obtained by duplicating the first R sub-pixel data (e.g., "V1_R(1,1)").

First G sub-pixel data at the first pixel row and the first pixel column among the RGB rearrangement data 610 may be extracted from the second view point RGB data 420 (S535). For example, as illustrated in FIGS. 9 and 14, the first G sub-pixel data of the RGB rearrangement data 610 may be extracted from G sub-pixel data (e.g., "V2_G(1,1)") at the first pixel row and the first pixel column in the second view point RGB data 420.

First and second B sub-pixel data at the first pixel row and adjacent first and second pixel columns among the RGB rearrangement data 610 may be extracted from one B sub-pixel data in the third view point RGB data 430 (S540). For example, as illustrated in FIGS. 9 and 14, the second B sub-pixel data of the RGB rearrangement data 610 may be extracted from B sub-pixel data (e.g., "V3_B(1,2)") at the first pixel row and the second pixel column in the third view point RGB data 430, and the first B sub-pixel data of the RGB rearrangement data 610 may be obtained by duplicating the second B sub-pixel data (e.g., "V3_B(1,2)").

Second G sub-pixel data at the first pixel row and the second pixel column among the RGB rearrangement data 610 may be extracted from the fourth view point RGB data 440 (S545). For example, as illustrated in FIGS. 9 and 14, the second G sub-pixel data of the RGB rearrangement data 610 may be extracted from G sub-pixel data (e.g., "V4_G(1,2)") at the first pixel row and the second pixel column in the fourth view point RGB data 440.

With respect to a second pixel row that is adjacent to the first pixel row and is the even-numbered pixel row (S520: EVEN-NUMBERED PIXEL ROW), third and fourth B sub-pixel data at the second pixel row and the first and second pixel columns among the RGB rearrangement data 610 may be extracted from one B sub-pixel data in the first view point RGB data 410 (S550). For example, as illustrated in FIGS. 9 and 14, the third B sub-pixel data of the RGB rearrangement data 610 may be extracted from B sub-pixel data (e.g., "V1_B(2,1)") at the second pixel row and the first pixel column in the first view point RGB data 410, and the fourth B sub-pixel data of the RGB rearrangement data 610 may be obtained by duplicating the third B sub-pixel data (e.g., "V1_B(2,1)").

Third G sub-pixel data at the second pixel row and the first pixel column among the RGB rearrangement data 610 may be extracted from the second view point RGB data 420 (S555). For example, as illustrated in FIGS. 9 and 14, the third G sub-pixel data of the RGB rearrangement data 610 may be extracted from G sub-pixel data (e.g., "V2_G(2,1)") at the second pixel row and the first pixel column in the second view point RGB data 420.

Third and fourth R sub-pixel data at the second pixel row and the first and second pixel columns among the RGB rearrangement data 610 may be extracted from one R sub-pixel data in the third view point RGB data 430 (S560). For example, as illustrated in FIGS. 9 and 14, the fourth R sub-pixel data of the RGB rearrangement data 610 may be extracted from R sub-pixel data (e.g., "V3_R(2,2)") at the second pixel row and the second pixel column in the third view point RGB data 430, and the third R sub-pixel data of the RGB rearrangement data 610 may be obtained by duplicating the fourth R sub-pixel data (e.g., "V3_R(2,2)").

Fourth G sub-pixel data at the second pixel row and the second pixel column among the RGB rearrangement data 610 may be extracted from the fourth view point RGB data 440 (S565). For example, as illustrated in FIGS. 9 and 14, the fourth G sub-pixel data of the RGB rearrangement data 610 may be extracted from G sub-pixel data (e.g., "V4_G(2,2)") at the second pixel row and the second pixel column in the fourth view point RGB data 440.

The light field 3D display device may generate RGBG data 620 by performing RGB-to-RGBG data conversion on the RGB rearrangement data 610 (S570). Since two adjacent R sub-pixel data (or two adjacent B sub-pixel data) in the RGB rearrangement data 610 are the same sub-pixel data, each R sub-pixel data (or each B sub-pixel data) of the RGBG data 620 may correspond to one sub-pixel data in the multi-view image data 400.

The light field 3D display device may display a 3D image based on the RGBG data 620 (S580). Since the RGBG data 620 include only sub-pixel data at the same point of view at each sub-pixel column, the 3D image may be accurately displayed.

The inventive concept may be applied to any light field 3D display device and an electronic device including the light field 3D display device, such as a cellular phone, a smartphone, a tablet computer, a wearable device, a personal digital assistant (PDA), a portable multimedia player (PMP), a digital camera, a music player, a portable game console, a navigation system, a digital television, a 3D television, a personal computer (PC), a home appliance, a laptop computer, etc.

As described above, in the method of operating the light field 3D display device having the RGBG pixel structure and the light field 3D display device according to exemplary embodiments of the inventive concept, RGB rearrangement data where RGB-to-RGBG data conversion and the RGBG pixel structure are considered may be generated from multi-view image data. Accordingly, the light field 3D display device may accurately display a light field 3D image.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. A method of operating a light field three-dimensional (3D) display device having an RGBG pixel structure, the method comprising:
   receiving multi-view image data including RGB data at multiple points of view, the multiple points of view including a first point of view, a second point of view, a third point of view and a fourth point of view that are different from each other;
   generating RGB rearrangement data including R sub-pixel data, G sub-pixel data, and B sub-pixel data from the multi-view image data by extracting two adjacent ones of the R sub-pixel data at a same pixel row from the RGB data at the first point of view among the multi-view image data, by extracting two adjacent ones of the G sub-pixel data at a same pixel row from the RGB data at the second and fourth points of view among the multi-view image data, and by extracting two adjacent ones of the B sub-pixel data at a same pixel row from the RGB data at the third point of view among the multi-view image data;
   generating RGBG data by performing RGB-to-RGBG data conversion on the RGB rearrangement data; and
   displaying a 3D image using the RGBG data.

2. The method of claim 1, wherein, among the RGB rearrangement data, the two adjacent ones of the R sub-pixel data at an odd-numbered pixel row and adjacent first and second pixel columns, and the two adjacent ones of the B sub-pixel data at an even-numbered pixel row adjacent to the odd-numbered pixel row and the first and second pixel columns are extracted from the RGB data at a same point of view among the multi-view image data.

3. The method of claim 1, wherein, among the RGB rearrangement data, the two adjacent ones of the B sub-pixel data at an odd-numbered pixel row and adjacent first and second pixel columns, and the two adjacent ones of the R sub-pixel data at an even-numbered pixel row adjacent to the odd-numbered pixel row and the first and second pixel columns are extracted from the RGB data at a same point of view among the multi-view image data.

4. The method of claim 1, wherein the multi-view image data include first view point RGB data, second view point RGB data, third view point RGB data, and fourth view point RGB data,
   wherein first and second R sub-pixel data at a first pixel row and adjacent first and second pixel columns among the RGB rearrangement data are extracted from the first view point RGB data,
   wherein first G sub-pixel data at the first pixel row and the first pixel column among the RGB rearrangement data is extracted from the second view point RGB data,
   wherein first and second B sub-pixel data at the first pixel row and the first and second pixel columns among the RGB rearrangement data are extracted from the third view point RGB data, and
   wherein second G sub-pixel data at the first pixel row and the second pixel column among the RGB rearrangement data is extracted from the fourth view point RGB data.

5. The method of claim 4, wherein the first R sub-pixel data of the RGB rearrangement data is extracted from R sub-pixel data at the first pixel row and the first pixel column among the first view point RGB data,
   wherein the second R sub-pixel data of the RGB rearrangement data is extracted from R sub-pixel data at the first pixel row and the second pixel column among the first view point RGB data,
   wherein the first G sub-pixel data of the RGB rearrangement data is extracted from G sub-pixel data at the first pixel row and the first pixel column among the second view point RGB data,
   wherein the first B sub-pixel data of the RGB rearrangement data is extracted from B sub-pixel data at the first pixel row and the first pixel column among the third view point RGB data,
   wherein the second B sub-pixel data of the RGB rearrangement data is extracted from B sub-pixel data at the first pixel row and the second pixel column among the third view point RGB data, and
   wherein the second G sub-pixel data of the RGB rearrangement data is extracted from G sub-pixel data at the first pixel row and the second pixel column among the fourth view point RGB data.

6. The method of claim 4, wherein the first R sub-pixel data of the RGB rearrangement data is extracted from R sub-pixel data at the first pixel row and the first pixel column among the first view point RGB data,
   wherein the second R sub-pixel data of the RGB rearrangement data is obtained by duplicating the first R sub-pixel data,
   wherein the first G sub-pixel data of the RGB rearrangement data is extracted from G sub-pixel data at the first pixel row and the first pixel column among the second view point RGB data,
   wherein the second B sub-pixel data of the RGB rearrangement data is extracted from B sub-pixel data at the first pixel row and the second pixel column among the third view point RGB data, wherein the first B sub-pixel data of the RGB rearrangement data is obtained by duplicating the second B sub-pixel data, and wherein the second G sub-pixel data of the RGB rearrangement data is extracted from G sub-pixel data at the first pixel row and the second pixel column among the fourth view point RGB data.

7. The method of claim 4, wherein third and fourth R sub-pixel data at a second pixel row adjacent to the first pixel row and the first and second pixel columns among the RGB rearrangement data are extracted from the third view point RGB data, wherein third G sub-pixel data at the second pixel row and the first pixel column among the RGB rearrangement data is extracted from the second view point RGB data, wherein third and fourth B sub-pixel data at the second pixel row and the first and second pixel columns among the RGB rearrangement data are extracted from the first view point RGB data, and wherein fourth G sub-pixel data at the second pixel row and the second pixel column among the RGB rearrangement data is extracted from the fourth view point RGB data.

8. The method of claim 7, wherein the third R sub-pixel data of the RGB rearrangement data is extracted from R sub-pixel data at the second pixel row and the first pixel column among the third view point RGB data, wherein the fourth R sub-pixel data of the RGB rearrangement data is extracted from R sub-pixel data at the second pixel row and the second pixel column among the third view point RGB data, wherein the third G sub-pixel data of the RGB rearrangement data is extracted from G sub-pixel data at the second pixel row and the first pixel column among the second view point RGB data, wherein the third B sub-pixel data of the RGB rearrangement data is extracted from B sub-pixel data at the second pixel row and the first pixel column among the first view point RGB data, wherein the fourth B sub-pixel data of the RGB rearrangement data is extracted from B sub-pixel data at the second pixel row and the second pixel column among the first view point RGB data, and wherein the fourth G sub-pixel data of the RGB rearrangement data is extracted from G sub-pixel data at the second pixel row and the second pixel column among the fourth view point RGB data.

9. The method of claim 7, wherein the fourth R sub-pixel data of the RGB rearrangement data is extracted from R sub-pixel data at the second pixel row and the second pixel column among the third view point RGB data, wherein the third R sub-pixel data of the RGB rearrangement data is obtained by duplicating the fourth R sub-pixel data, wherein the third G sub-pixel data of the RGB rearrangement data is extracted from G sub-pixel data at the second pixel row and the first pixel column among the second view point RGB data, wherein the third B sub-pixel data of the RGB rearrangement data is extracted from B sub-pixel data at the second pixel row and the first pixel column among the first view point RGB data, wherein the fourth B sub-pixel data of the RGB rearrangement data is obtained by duplicating the third B sub-pixel data, and wherein the fourth G sub-pixel data of the RGB rearrangement data is extracted from G sub-pixel data at the second pixel row and the second pixel column among the fourth view point RGB data.

10. The method of claim 1, wherein generating the RGBG data by performing the RGB-to-RGBG data conversion on the RGB rearrangement data includes:

averaging the two adjacent ones of the R sub-pixel data at a first pixel row and adjacent first and second pixel columns among the RGB rearrangement data to generate first R sub-pixel data at the first pixel row and the first pixel column among the RGBG data;

generating first G sub-pixel data at the first pixel row and the first pixel column among the RGBG data that is substantially the same as the G sub-pixel data at the first pixel row and the first pixel column among the RGB rearrangement data;

averaging the two adjacent ones of the B sub-pixel data at the first pixel row and the first and second pixel columns among the RGB rearrangement data to generate first B sub-pixel data at the first pixel row and the second pixel column among the RGBG data; and generating second G sub-pixel data at the first pixel row and the second pixel column among the RGBG data that is substantially the same as the G sub-pixel data at the first pixel row and the second pixel column among the RGB rearrangement data.

11. The method of claim 10, wherein generating the RGBG data by performing the RGB-to-RGBG data conversion on the RGB rearrangement data further includes:

averaging the two adjacent ones of the B sub-pixel data at a second pixel row adjacent to the first pixel row and the first and second pixel columns among the RGB rearrangement data to generate second B sub-pixel data at the second pixel row and the first pixel column among the RGBG data;

generating third G sub-pixel data at the second pixel row and the first pixel column among the RGBG data that is substantially the same as the G sub-pixel data at the second pixel row and the first pixel column among the RGB rearrangement data;

averaging the two adjacent ones of the R sub-pixel data at the second pixel row and the first and second pixel columns among the RGB rearrangement data to generate second R sub-pixel data at the second pixel row and the second pixel column among the RGBG data; and generating fourth G sub-pixel data at the second pixel row and the second pixel column among the RGBG data that is substantially the same as the G sub-pixel data at the second pixel row and the second pixel column among the RGB rearrangement data.

12. The method of claim 1, wherein generating the RGB rearrangement data and the RGB-to-RGBG data conversion are performed by a display driver included in the light field 3D display device.

13. The method of claim 1, wherein generating the RGB rearrangement data is performed by a host processor that controls the light field 3D display device, and wherein the RGB-to-RGBG data conversion is performed by a display driver included in the light field 3D display device.

14. A method of operating a light field three-dimensional (3D) display device having an RGBG pixel structure, the method comprising:

receiving multi-view image data including first through fourth view point RGB data at a first point of view, a second point of view, a third point of view and a fourth point of view that are different from each other;

generating RGB rearrangement data including first and second R sub-pixel data, first and second G sub-pixel data, and first and second B sub-pixel data from the multi-view image data by extracting the first and second R sub-pixel data at a first pixel row and adjacent first and second pixel columns from the first view point RGB data at the first point of view, by extracting the first G sub-pixel data at the first pixel row and the first pixel column from the second view point RGB data at the second point of view, by extracting the first and second B sub-pixel data at the first pixel row and the first and second pixel columns from the third view point RGB data at the third point of view, and by extracting the second G sub-pixel data at the first pixel row and the second pixel column from the fourth view point RGB data at the fourth point of view;

generating RGBG data by performing RGB-to-RGBG data conversion on the RGB rearrangement data; and displaying a 3D image using the RGBG data.

15. The method of claim 14, wherein the first R sub-pixel data of the RGB rearrangement data is extracted from R sub-pixel data at the first pixel row and the first pixel column among the first view point RGB data, wherein the second R sub-pixel data of the RGB rearrangement data is extracted from R sub-pixel data at the first pixel row and the second pixel column among the first view point RGB data, wherein the first G sub-pixel data of the RGB rearrangement data is extracted from G sub-pixel data at the first pixel row and the first pixel column among the second view point RGB data, wherein the first B sub-pixel data of the RGB rearrangement data is extracted from B sub-pixel data at the first pixel row and the first pixel column among the third view point RGB data, wherein the second B sub-pixel data of the RGB rearrangement data is extracted from B sub-pixel data at the first pixel row and the second pixel column among the third view point RGB data, and wherein the second G sub-pixel data of the RGB rearrangement data is extracted from G sub-pixel data at the first pixel row and the second pixel column among the fourth view point RGB data.

16. The method of claim 14, wherein the first R sub-pixel data of the RGB rearrangement data is extracted from R sub-pixel data at the first pixel row and the first pixel column among the first view point RGB data, wherein the second R sub-pixel data of the RGB rearrangement data is obtained by duplicating the first R sub-pixel data, wherein the first G sub-pixel data of the RGB rearrangement data is extracted from G sub-pixel data at the first pixel row and the first pixel column among the second view point RGB data, wherein the second B sub-pixel data of the RGB rearrangement data is extracted from B sub-pixel data at the first pixel row and the second pixel column among the third view point RGB data, wherein the first B sub-pixel data of the RGB rearrangement data is obtained by duplicating the second B sub-pixel data, and wherein the second G sub-pixel data of the RGB rearrangement data is extracted from G sub-pixel data at the first pixel row and the second pixel column among the fourth view point RGB data.

17. The method of claim 14, wherein third and fourth R sub-pixel data at a second pixel row adjacent to the first pixel row and the first and second pixel columns among the RGB rearrangement data are extracted from the third view point RGB data, wherein third G sub-pixel data at the second pixel row and the first pixel column among the RGB rearrangement data is extracted from the second view point RGB data, wherein third and fourth B sub-pixel data at the second pixel row and the first and second pixel columns among the RGB rearrangement data are extracted from the first view point RGB data, and wherein fourth G sub-pixel data at the second pixel row and the second pixel column among the RGB rearrangement data is extracted from the fourth view point RGB data.

18. The method of claim 17, wherein the third R sub-pixel data of the RGB rearrangement data is extracted from R sub-pixel data at the second pixel row and the first pixel column among the third view point RGB data, wherein the fourth R sub-pixel data of the RGB rearrangement data is extracted from R sub-pixel data at the second pixel row and the second pixel column among the third view point RGB data, wherein the third G sub-pixel data of the RGB rearrangement data is extracted from G sub-pixel data at the second pixel row and the first pixel column among the second view point RGB data, wherein the third B sub-pixel data of the RGB rearrangement data is extracted from B sub-pixel data at the second pixel row and the first pixel column among the first view point RGB data, wherein the fourth B sub-pixel data of the RGB rearrangement data is extracted from B sub-pixel data at the second pixel row and the second pixel column among the first view point RGB data, and wherein the fourth G sub-pixel data of the RGB rearrangement data is extracted from G sub-pixel data at the second pixel row and the second pixel column among the fourth view point RGB data.

19. The method of claim 17, wherein the fourth R sub-pixel data of the RGB rearrangement data is extracted from R sub-pixel data at the second pixel row and the second pixel column among the third view point RGB data, wherein the third R sub-pixel data of the RGB rearrangement data is obtained by duplicating the fourth R sub-pixel data, wherein the third G sub-pixel data of the RGB rearrangement data is extracted from G sub-pixel data at the second pixel row and the first pixel column among the second view point RGB data, wherein the third B sub-pixel data of the RGB rearrangement data is extracted from B sub-pixel data at the second pixel row and the first pixel column among the first view point RGB data, wherein the fourth B sub-pixel data of the RGB rearrangement data is obtained by duplicating the third B sub-pixel data, and wherein the fourth G sub-pixel data of the RGB rearrangement data is extracted from G sub-pixel data at the second pixel row and the second pixel column among the fourth view point RGB data.

20. A light field three-dimensional (3D) display device comprising:

a display panel having an RGBG pixel structure;

an optical device configured to control directions of light rays generated by the display panel; and a display driver configured to receive multi-view image data including RGB data at multiple points of view, and to drive the display panel to display a 3D image using RGBG data, the multiple points of view including a first point of view, a second point of view, a third point of view and a fourth point of view that are different from each other, the display driver including:

an RGB data rearranging block configured to generate RGB rearrangement data including R sub-pixel data, G sub-pixel data, and B sub-pixel data from the multi-view image data by extracting two adjacent ones of the R sub-pixel data at a same pixel row from the RGB data at the first point of view among the multi-view image data, by extracting two adjacent ones of the G sub-pixel data at a same pixel row from the RGB data at the second and fourth points of view among the multi-view image data, and by extracting two adjacent ones of the B sub-pixel data at a same pixel row from the RGB data at the third point of view among the multi-view image data; and an RGB-to-RGBG converter configured to generate the RGBG data by performing RGB-to-RGBG data conversion on the RGB rearrangement data.

* * * * *